(12) United States Patent
Kisu et al.

(10) Patent No.: US 7,482,538 B2
(45) Date of Patent: Jan. 27, 2009

(54) POWER SUPPLY APPARATUS FOR SLIDING STRUCTURE

(75) Inventors: Naomi Kisu, Shizuoka (JP); Masataka Nishijima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/582,507

(22) Filed: Oct. 18, 2006

(65) Prior Publication Data

US 2007/0084619 A1 Apr. 19, 2007

(30) Foreign Application Priority Data

Oct. 24, 2005 (JP) .............................. 2005-308099
Mar. 2, 2006 (JP) .............................. 2006-055889

(51) Int. Cl.
H01B 7/00 (2006.01)
H01B 7/06 (2006.01)
H02G 3/04 (2006.01)
H01R 33/00 (2006.01)

(52) U.S. Cl. ..................... 174/72 A; 174/69; 174/70 C; 439/34

(58) Field of Classification Search ............... 174/72 A, 174/68.1, 68.3, 72 C, 21 R, 69, 70 C, 71 R, 174/72 R, 97, 98, 99 R, 99 E, 100, 135; 219/723; 439/34, 162, 207; 248/49, 68.1; 191/22 R, 191/23 R; 296/155

See application file for complete search history.

(56) References Cited

U.S. PATENT DOCUMENTS 6,811,404 B2 * 11/2004 Doshita et al. ................ 439/34
6,881,902 B2 * 4/2005 Aoki et al. ................. 174/72 A
7,284,785 B2 * 10/2007 Gotou et al. ................. 296/155
2002/0005014 A1 1/2002 Doshita et al.
2006/0254797 A1 * 11/2006 Charara et al. ............. 174/72 A

FOREIGN PATENT DOCUMENTS

| DE | 101 18 205 | | 10/2001 |
|---|---|---|---|
| JP | 08091145 A | * | 4/1996 |
| JP | 2001301545 A | * | 10/2001 |
| JP | 2003-25850 | | 1/2003 |

OTHER PUBLICATIONS

Official communication received from the German Patent Office mailed Oct. 24, 2006 with English translation (7 pages).

* cited by examiner

*Primary Examiner*—Angel R Estrada
*Assistant Examiner*—David M Sinclair
(74) *Attorney, Agent, or Firm*—Kratz, Quintos & Hanson, LLP

(57) ABSTRACT

A power supply apparatus for a sliding structure, which can be arranged in a small space in the sliding structure, the power supply apparatus including a wiring harness having a vertical path portion; a harness fixing member for fixing one end of the vertical path portion of the wiring harness on the sliding structure; a fixed base fixed on the sliding structure for holding the other end of the vertical path portion; and a swing member mounted on the fixed base to swing freely in a horizontal plane for allowing the vertical path portion to be twisted along a circumferential direction of itself and leading a part of the wiring harness continued to the vertical path portion toward a fixed structure. Instead of the fixed base, a movable base 5', and a guide rail to be engaged with the movable base can be applied.

14 Claims, 11 Drawing Sheets

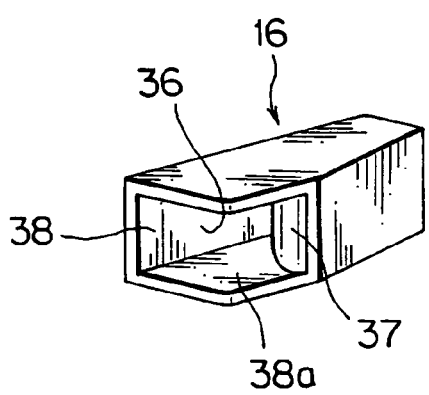
F I G. 1 1
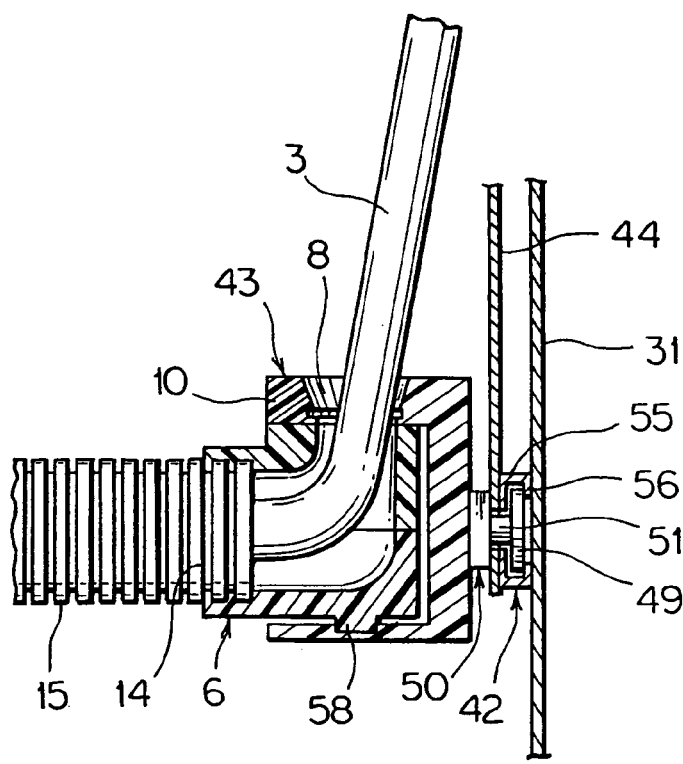
F I G. 1 4
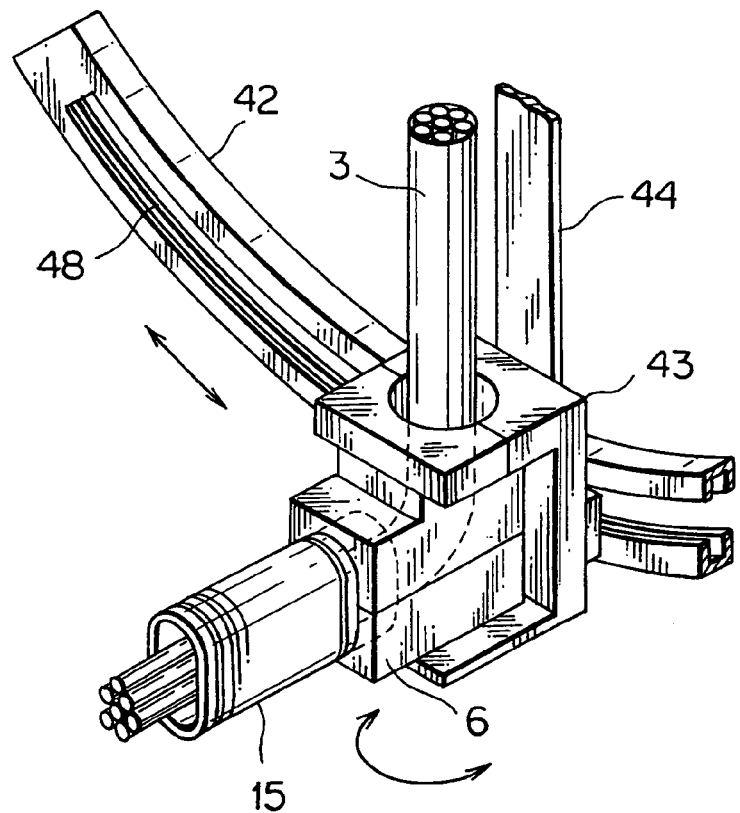
F I G. 1 3

POWER SUPPLY APPARATUS FOR SLIDING STRUCTURE

The priority application Number Japan Patent Application 2005-308099 upon which this patent application is based is hereby incorporated by reference.

BACKGROUND OF THE INVENTION

1. Field of the Invention

This invention relates to a power supply apparatus for a sliding structure, which is mounted on the sliding structure such as a sliding door of a vehicle and supplies power continuously to an auxiliary device at the sliding structure.

2. Description of the Related Art

FIGS. 17, 18 show one embodiment of a usual power supply apparatus for a sliding door (refer to Patent Document 1).

The power supply apparatus 61 for the sliding door includes a long sideways guide member 63 mounted on a sliding door 62 of a car, a slider 64 engaging slidably with a rail portion of the guide member 63, a swing member 65 (FIG. 18) supported pivotably in a horizontal plane by a shaft vertical to the slider 64 and a caterpillar-like harness cover 66, which is bent into U-shape inside the guide member 63, being wired bendably from the swing member 65 to a car body (not shown).

The cover 66 is covered about an area between the sliding door 62 and the car body with a tube 67. A plurality of electric wires 68 (wiring harness) is passed through the cover 66 and the slider 64.

By opening the sliding door 62 from a condition in FIG. 17 in a direction of an arrow A, the slider 64 moves forwardly along the guide member 63, and the wiring harness 68 extends to become J-shape in the guide member 63 together with the cover 66. According to opening/closing the sliding door 62, the wiring harness 68 extends and shrinks together with the cover 66, so that an extra length of the wiring harness is absorbed. Patent Document 1 is the Japan Published Patent Application No. 2003-25850.

SUMMARY OF THE INVENTION

Objects to be Solved

The usual power supply apparatus 61 for the sliding door mentioned above is arranged along the long sideways thereof on the sliding door 62, so that flexibility of the layout of the other electronic component and auxiliary devices is limited. When the sliding door 62 is opened and closed, the wiring harness 68 between the slider 64 and the swing member 65 is bent into V-shape, so that a bend portion 68a of the wiring harness 68 is acted with a large bending stress, so that durability of the wiring harness 68 will be deteriorated. The caterpillar-like cover 66 is required, so that cost of the structure will be increased.

The above problems occur not only in the sliding door 62 of the car, but also in a case that the power supply apparatus mentioned above is applied on any sliding structures such as a sliding door for a vehicle and a sliding door for manufacturing machine.

One object of the present invention is to provide a power supply apparatus for a sliding structure, which can be provided in a small space in the sliding structure, and increase durability of the wiring harness against opening and closing the sliding structure and has a low cost structure.

How to Attain the Object of the Present Invention

In order to overcome the above problems and attain the object of the present invention, a power supply apparatus for a sliding structure is characterised in that the power supply apparatus includes a wiring harness having a vertical path portion; a harness fixing member for fixing one end of the vertical path portion of the wiring harness on the sliding structure; a fixed base fixed on the sliding structure for holding the other end of the vertical path portion; and a swing member mounted on the fixed base to swing freely in a horizontal plane for allowing the vertical path portion to be twisted along a circumferential direction of itself and leading a part of the wiring harness continued to the vertical path portion toward a fixed structure.

A power supply apparatus for a sliding structure is characterised in that the power supply apparatus includes a wiring harness having a vertical path portion; a harness fixing member for fixing one end of the vertical path portion of the wiring harness on the sliding structure; a movable base holding the other end of the vertical path portion; and a swing member mounted on the movable base to swing freely in a horizontal plane for allowing the vertical path portion to be twisted along a circumferential direction of itself and leading a part of the wiring harness continued to the vertical path portion toward a fixed structure.

The power supply apparatus for the sliding structure is further characterised in the power supply apparatus mentioned above in that the power supply apparatus further includes a guide rail engaging slidably with the movable base.

The power supply apparatus for the sliding structure is characterised in the power supply apparatus mentioned above in that the guide rail is formed into an arc shape.

The power supply apparatus for the sliding structure is characterised in the power supply apparatus mentioned above in that the movable base is supported rotatably by the guide rail so as to be oriented horizontally.

The power supply apparatus for the sliding structure is furthermore characterised in the power supply apparatus mentioned above in that the power supply apparatus further includes a moving arm, and one end of the moving arm is connected to the movable base, and the other end of the moving arm is supported movably by the sliding structure.

The power supply apparatus for the sliding structure is furthermore characterised in the power supply apparatus mentioned above in that the power supply apparatus further includes a case for receiving the vertical path portion and the movable base.

The power supply apparatus for the sliding structure is characterised in the power supply apparatus mentioned above in that the power supply apparatus further includes a protecting tube passing the part of the wiring harness therethrough, and the protecting tube is wired linearly when the sliding structure is closed and is bent when the sliding structure is opened.

The power supply apparatus for the sliding structure is furthermore characterised in the power supply apparatus mentioned above in that the power supply apparatus further includes a stopper projection that acts as an angle limiter, limiting a movable angle of the movable base less than 180 degrees.

The power supply apparatus for the sliding structure is furthermore characterised in the power supply apparatus mentioned above in that the power supply apparatus further includes a harness fixing unit for fixing the protecting tube to pass the part of the wiring harness therethrough on the fixed structure, and the harness fixing unit has a guide surface for forming the protecting tube into a curved shape when the sliding structure is completely opened.

The power supply apparatus for the sliding structure is furthermore characterised in the power supply apparatus mentioned above in that the protecting tube is a flat bellows-type tube, which is wired to align a lengthwise of a cross section of the flat bellows-type tube vertically.

EFFECT OF THE INVENTION

According to the invention, since the fixed base is fixed and the extra length of the wiring harness generated by motion of the sliding structure is absorbed by twisting motion along a circumferential direction of the vertical path portion of the wiring harness, the vertical path portion can be shortened and the size of the power supply apparatus can be reduced. Thereby, flexibility of layout of the auxiliary devices at the sliding structure is increased. The wiring harness is wired curvedly from the vertical path portion to the fixed structure with a large angle of 90 degrees, so that bend portion is not loaded with an excessive stress and durability of the wiring harness is improved. Since the wiring harness is bent horizontally between the sliding structure and the fixed structure, a usual expensive caterpillar-like cover is not required. Instead of that, a low-cost protecting tube can be used and cost of the wiring harness structure can be reduced.

According to the invention, since the extra length of the wiring harness generated by motion of the sliding structure is absorbed by twisting motion along a circumferential direction of the vertical path portion of the wiring harness, the vertical path portion can be shortened and the size of the power supply apparatus can be reduced. Thereby, flexibility of layout of the auxiliary devices at the sliding structure is increased. The wiring harness is wired curvedly from the vertical path portion to the fixed structure with a large angle of 90 degrees, so that a bend portion of the wiring harness is not loaded with an excessive stress and durability of the wiring harness is improved. Since the wiring harness is bent horizontally between the sliding structure and the fixed structure, a usual expensive caterpillar-like cover is not required. Instead of that, a low-cost protecting tube can be used and cost of the wiring harness structure can be reduced.

According to the invention, since the movable base can move back and forth smoothly and securely along the guide rail, the wiring harness can be moved and bent securely and reliability of continuously supplying power is improved. Since the extra length can be absorbed enough by the short vertical path portion and the short guide rail, the case can be shrunk and flexibility of layout of the auxiliary devices at the sliding structure is improved.

According to the invention, sliding friction between the movable base and the guide rail is reduced, so that the movable base can be moved smoothly along the guide rail by a small force. Thereby, operability of opening/closing the sliding structure is improved. Wear of the movable base and the guide rail is prevented, so that durability thereof is improved.

According to the invention, since the same orientation of the movable base during motion is always maintained, a twisting force does not act on parts between the movable base and the fixed structure of the wiring harness and the protecting tube. Thereby, durability of these parts is improved and formability of the wiring harness when opening/closing the sliding structure is improved and operability of opening/closing the sliding structure is improved.

According to the invention, since the movable base supported by the moving arm moves smoothly along the arc-shape guide rail, the movable base can move securely without stick-slip and an effect of absorbing the slack of the wiring harness is improved.

According to the invention, by assembling the case in the sliding structure, the power supply apparatus can be efficiently mounted and operability of mounting is improved.

According to the invention, since the protecting tube, which the part of the wiring harness passes through, is bent horizontally into a U-shape or J-shape with a relatively large radius, durability of bending of the wiring harness will be improved.

According to the invention, since the swing member can swing securely at a start of opening/closing the sliding structure, it is prevented that the protecting tube, which the part of the wiring harness passes through, is folded. Thereby, its durability is improved. Since the protecting tube, which the part of the wiring harness passes through, is securely bent along a correct curvature, the usual expensive caterpillar-like cover is not required and cost of the power supply apparatus is reduced.

According to the invention, since the protecting tube, which the part of the wiring harness passes through, is bent with a relatively large radius along the curved guide surface of the harness fixed unit when the sliding structure is completely opened, durability of bending of the part of the wiring harness and the protecting tube is improved.

According to the invention, since the flat bellows-type protecting tube, which the part of the wiring harness passes through, is bent smoothly without folding along the flat surface, the durability of bending of the bellows-type tube is improved and operations of opening/closing the sliding can be acted smoothly by a small force.

The above and other objects and features of this invention will become more apparent from the following description taken in conjunction with the accompanying drawings.

BRIEF DESCRIPTION OF THE DRAWINGS

FIG. 11 is a perspective view of one embodiment of a harness fixing unit mounted on a car body;

FIG. 13 is a perspective view of an engaging condition of a slider and a guide rail of the fourth embodiment of a power supply apparatus shown in FIG. 12;

FIG. 14 is a longitudinally sectional view of the engaging condition of the slider and the guide rail shown in FIG. 12;

DESCRIPTION OF THE PREFERRED EMBODIMENT

Figure 1:
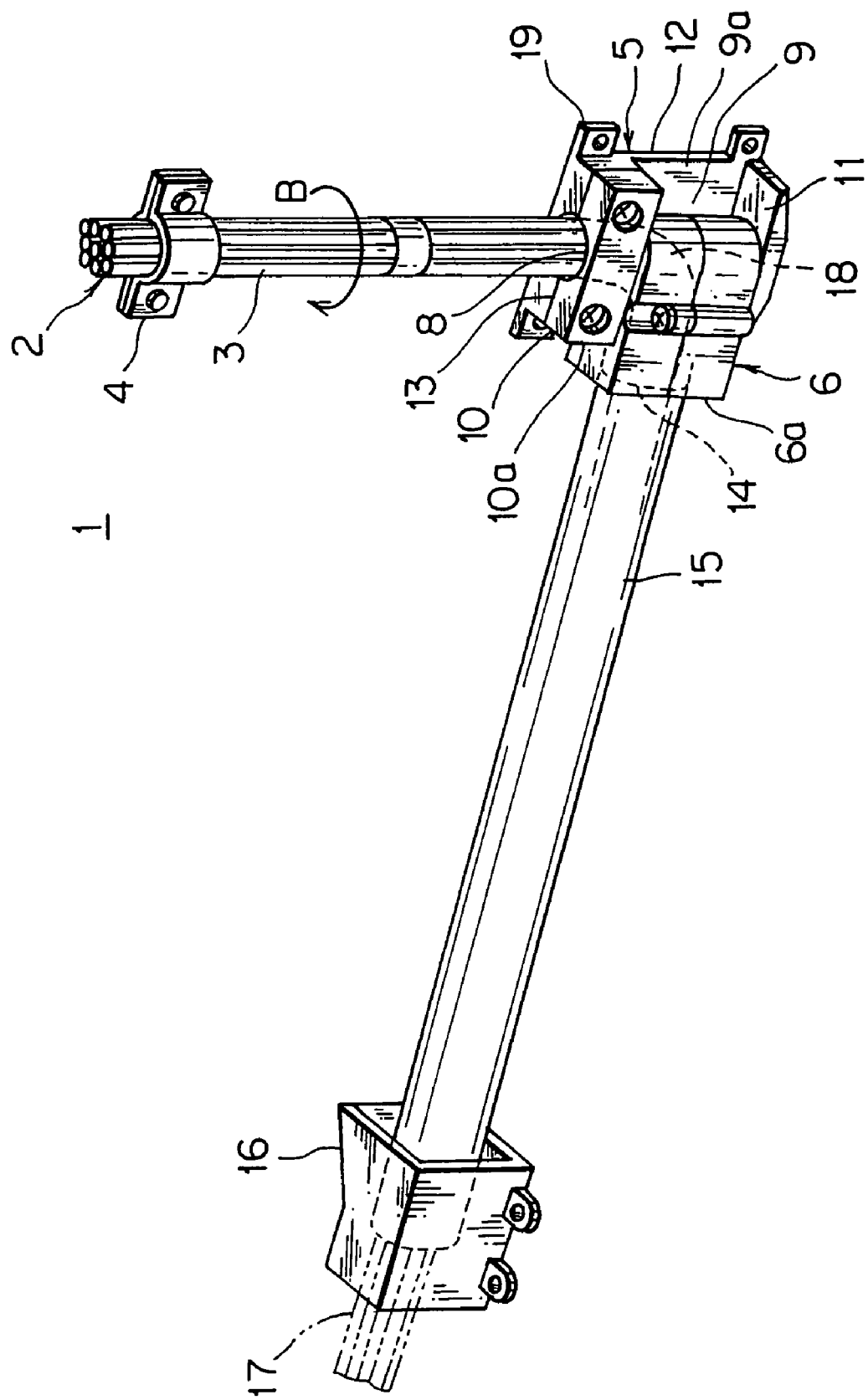
FIG. 1 is a perspective view of a sliding structure in a closed condition of a first embodiment of a power supply apparatus for the sliding structure according to the present invention.
Figure 2:
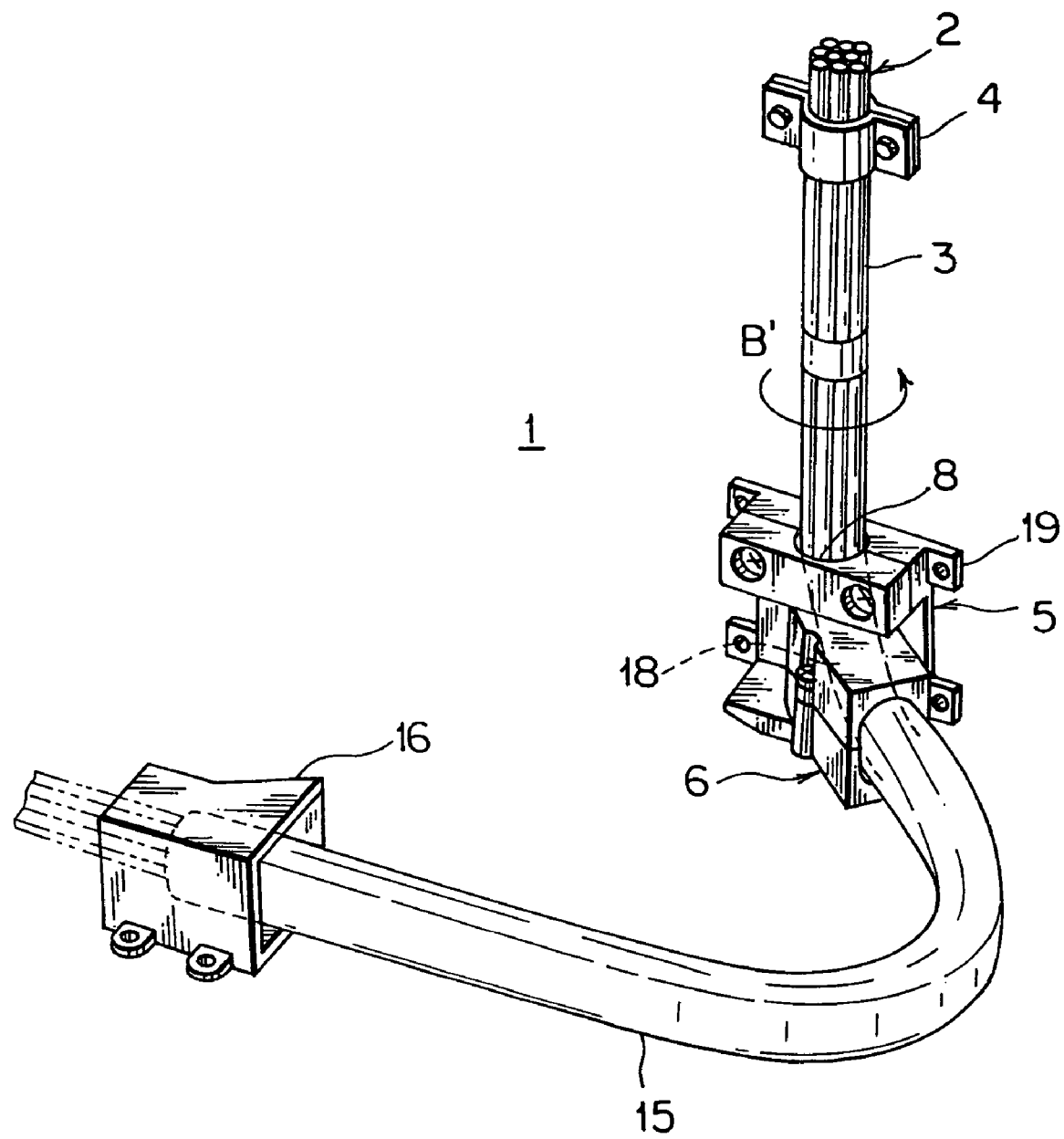
FIG. 2 is a perspective view of the sliding structure in an open condition of the first embodiment of the power supply apparatus shown in FIG. 1.

FIGS. 1, 2 show a first embodiment of a power supply apparatus for a sliding structure according to the present invention.

The power supply apparatus 1 for the sliding structure includes a wiring harness 2 (a plurality of electric wires) having a vertical path portion 3, a harness fixing member 4 made of synthetic resin or metal for fixing the vertical path portion 3 arranged vertically on the sliding door of a car (sliding structure), a fixed base 5 made of synthetic resin and arranged after the vertical path portion 3, and a swing member 6 made of synthetic resin and supported pivotably in a horizontal plane by the fixed base 5.

The harness fixing member 4 in the embodiment is a curved plate clamp for clamping and fixing the electric wires of the wiring harness 2 on a door panel with a bolt or a lock pin. The harness fixing member 4 is not limited only to this clamp, but also any-type fixing member, such as a band or a adhesive tape, for fixing a top end of the vertical path portion 3 of the wiring harness 2 vertically on the door panel or a door trim. In the embodiment, the vertical path portion 3 of the wiring harness 2 between the harness fixing member 4 and the fixed base 5 is wired as a plurality of exposed electric wires.

The fixed base 5 has a harness inserting hole 8 vertically at a top side thereof and a space 9, in the form of a horizontal groove, holding the swing member 6 pivotably in the horizontal plane under the harness inserting hole 8. The space 9 has openings 9a at front and rear sides of the car, and is formed into a U-shape with a top and bottom horizontal walls 10, 11 and a vertical wall 12. The vertical harness inserting hole 8 is separable at a center (separating surface is marked with 13) in a widthwise direction of the car (right/left direction). By separating a near side top wall 10a in FIG. 1, the wiring harness 2 can be inserted into the harness inserting hole 8. The fixed base 5 is fixed on an inner surface of the door panel or the door trim of the sliding door with a screw.

The swing member 6 has a hollow cylindrical axial portion (not shown) coaxially with the harness inserting hole 8 of the fixed base 5, and the axial portion thereof is engaged pivotably with ring-shape grooves (not shown) on inner surfaces of the top/bottom walls 10, 11 of the fixed base 5. Instead of that, by providing hollow cylindrical axial portions (not shown) projecting coaxially with the harness inserting hole 8 from the inner surfaces of the top/bottom walls 10, 11 of the fixed base 5, the axial portion can be engaged pivotably with ring-shape grooves (not shown) on top/bottom surfaces of the swing member 6.

The swing member 6 has a coaxial vertical harness inserting hole (not shown) inside the ring-shape axial portion. The vertical harness inserting hole is communicated coaxially with the harness inserting hole 8 of the fixed base 5 and continued to a horizontal harness inserting hole 14 of the swing member 6. The vertical harness inserting hole is formed with a round cross section, and the horizontal harness inserting hole 14 is formed with a rectangular cross section or an oval cross section corresponding to a later-described protecting 15 which can be a corrugate tube or flat bellows type tube.

The swing member 6 is formed separable to top and bottom portions. In a condition of separating to the top and bottom portions, the wiring harness 2 can be inserted into the harness inserting hole. The top and bottom portions are fixed to each other with lock means, such as a bolt or locking hook and engaging recess. A front end 6a of the swing member 6 faces to a car body (fixed structure) to be pivotable in a back-and-forth direction of the car body.

One end of the protecting tube 15 made of synthetic resin is held and fixed in the horizontal harness inserting hole 14 of the swing member 6. The protecting tube 15 is a usual corrugate tube with surrounding concave grooves and surrounding convex ribs (not shown) arranged alternately in a lengthwise direction of the tube to have a good flexibility. Ribs to be engaged with the concave grooves of the protecting tube with the oval cross section and fixed together are arranged on an inner surface of the horizontal harness inserting hole 14 of the swing member 6. If a protecting tube with a round cross section is used, the rotecting tube 15 is held rotatably in a round direction by the ribs.

The other end of the protecting tube 15 is fixed by ribs similar to that of the swing member 6 on a harness fixing unit 16 at the car body. A plurality of electric wires 17 of the wiring harness 2 from the harness fixing unit 16 is connected with a connector of a wiring harness (not shown) at the car body (power supply side).

The harness fixing unit 16 is rigidly fixed on the car body with a plurality of bolts. The harness fixing unit 16 will be described later in detail in a third embodiment. The wiring harness 2 is wired horizontally from the swing member 6 to the harness fixing unit 16.

FIG. 1 shows a complete closed condition, in which the sliding door (not shown) is closed forwardly. The harness fixing member 4 and the fixed base 5 fixed on the sliding door move forwardly to be integrated with the sliding door. Thereby, the swing member 6 pivots slantwise rearwardly about the top and bottom axial portions (not shown), and the vertical path portion 3 of the wiring harness 2 is twisted in a round or axial direction as shown in an arrow B (clockwise in FIG. 1) between the harness fixing member 4 and the swing member 6 to absorb the pivoting motion of the swing member 6. A horizontal portion (protecting tube 15) of the wiring harness 2 is pulled rearwardly to extend straightly between the swing member 6 and the harness fixing unit 16 at the car body.

By sliding the sliding door in the closed condition in FIG. 1 rearwardly to open it (completely open), the harness fixing member 4 and the fixed base 5 move rearwardly to be integrated with the sliding door as shown in FIG. 2. Thereby, the swing member 6 pivots slantwise forwardly about the axial portions, and the vertical path portion 3 of the wiring harness 2 is twisted in a round direction as shown in an arrow B' (counterclockwise in FIG. 2) between the harness fixing member 4 and the swing member 6 to absorb the pivoting motion of the swing member 6. The protecting tube 15 of the wiring harness 2 is bent forwardly to be formed into a U-shape or J-shape about the harness fixing unit 16 as a fixed point at the car body.

A length of the vertical path portion 3 of the wiring harness 2 may be short and of 20-30 cm. Forming the vertical path portion 3 short, twisting the vertical path portion 3 in the round direction according to opening/closing the sliding door, arranging the swing member 6 pivotable back-and-forth direction (direction of opening/closing the sliding door) about the fixed base 5, and making the protecting tube 15 of the wiring harness 2 horizontally bendable to the U-shape or the J-shape, a compact power supply apparatus can be applied to open and close the sliding door.

Figure 3:
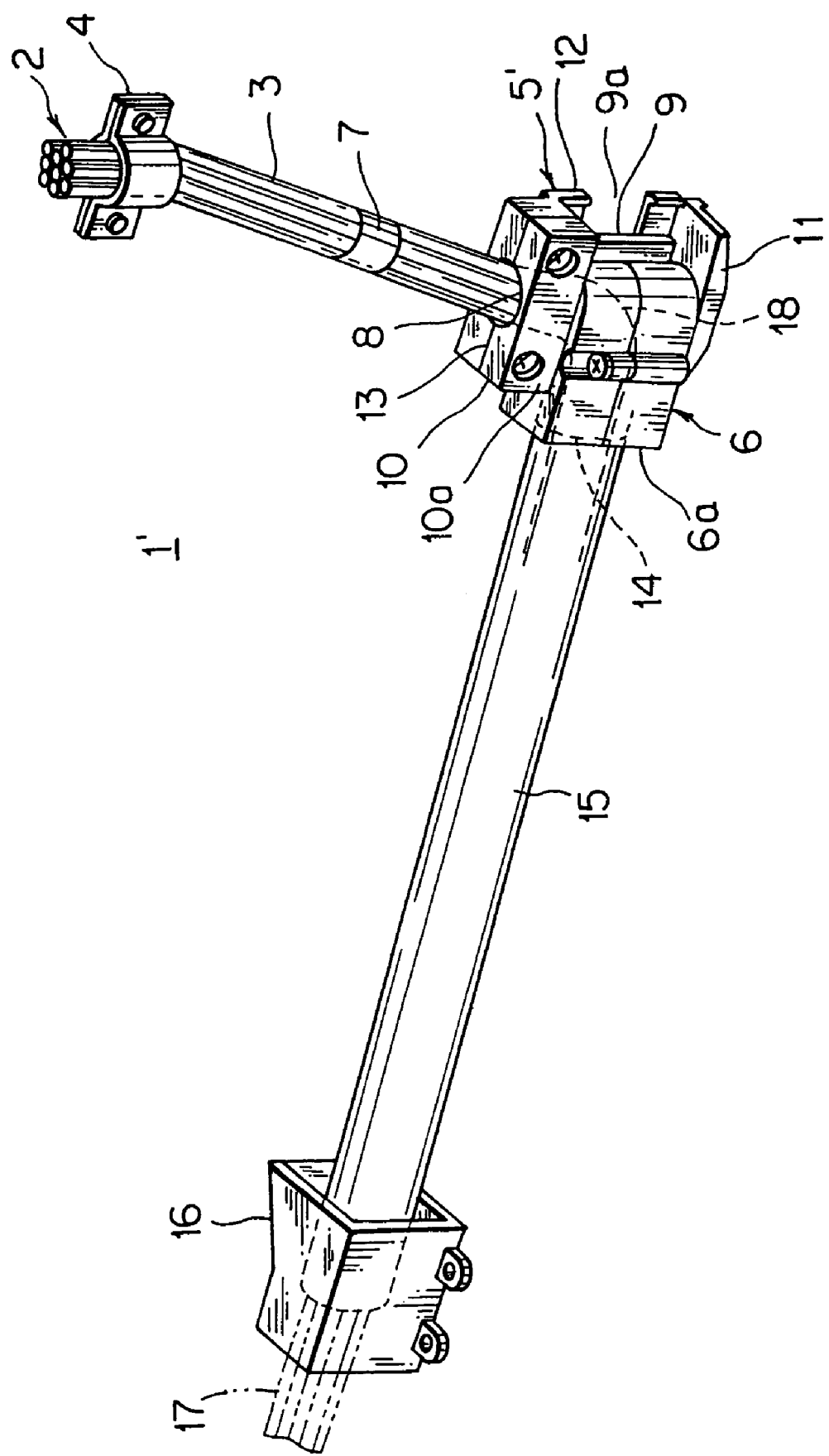
FIG. 3 is a perspective view of a sliding structure in a closed condition of a second embodiment of a power supply apparatus for the sliding structure according to the present invention.
Figure 4:
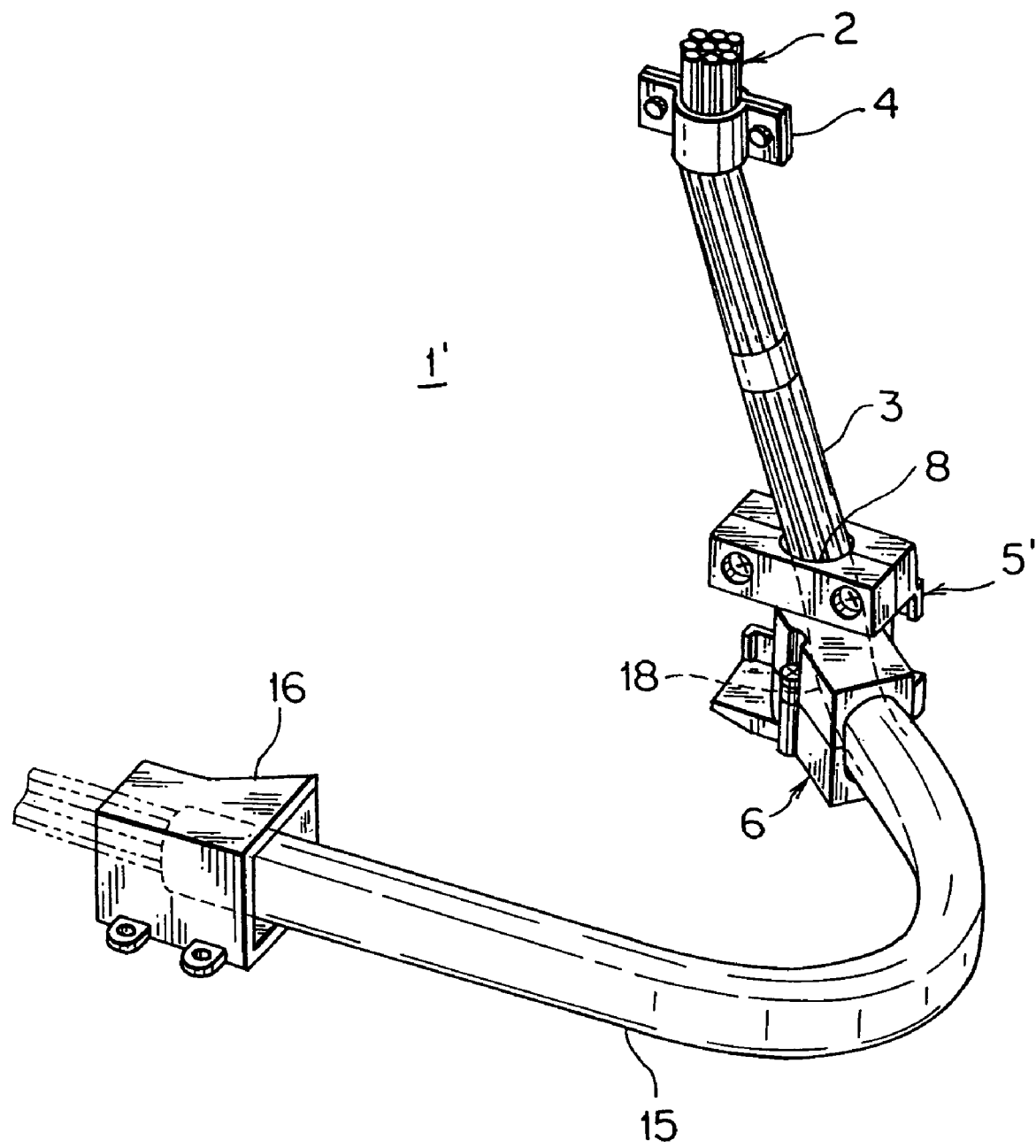
FIG. 4 is a perspective view of the sliding structure in an open condition of the second embodiment of the power supply apparatus shown in FIG. 3.

FIGS. 3, 4 show a second embodiment of a power supply apparatus for a sliding structure according of the present invention.

The power supply apparatus 1' for the sliding structure includes a wiring harness 2 (a plurality of electric wires) having a vertical path portion 3, a harness fixing member 4 made of synthetic resin or metal for fixing the vertical path portion 3 arranged vertically on the sliding door of a car (sliding structure), a pendulum-like movable base 5' made of synthetic resin and arranged after the vertical path portion 3, and a swing member 6 made of synthetic resin and supported pivotably in a horizontal plane by the movable base 5. The movable base 5' is modified by removing a bracket 19 from the fixed base 5 of the first embodiment.

The harness fixing member 4 in the embodiment is a curved plate clamp for clamping and fixing the electric wires of the wiring harness 2 on a door panel with a bolt or a lock pin. The harness fixing member 4 is not limited only to this clamp, but also any-type fixing member, such as a band or an adhesive tape, for fixing a top end of the vertical path portion 3 of the wiring harness 2 vertically on the door panel or a door trim.

In the embodiment, the vertical path portion 3 of the wiring harness 2 between the harness fixing member 4 and the movable base 5' is wired as a plurality of exposed electric wires. A middle portion of lengthwise of the vertical path portion 3 can be bundled with bundling means 7 such as a tape winding so as not to affect twist motion of the vertical path portion 3.

The movable base 5' has a harness inserting hole 8 vertically at a top side thereof and a space 9 holding the swing member 6 pivotably in the horizontal plane under the harness inserting hole 8. The space 9 has openings 9a at front and rear sides of the car, and is formed into a U-shape with a top and bottom horizontal walls 10, 11 and a vertical wall 12. The vertical harness inserting hole 8 is separable at a center (separating surface is marked with 13) in a widthwise direction of the car (right/left direction). By separating a near side top wall 10a in FIG. 1, the wiring harness 2 can be inserted into the harness inserting hole 8. The movable base 5' is arranged pivotably (movably back-and-forth) in a back-and-forth direction of the car along an inner surface of the door panel or the door trim of the sliding door.

The swing member 6 has a hollow cylindrical axial portion (not shown) coaxially with the harness inserting hole 8 of the movable base 5', and the axial portion thereof is engaged pivotably with ring-shape grooves (not shown) on inner surfaces of the top/bottom walls 10, 11 of the movable base 5'. Instead of that, by providing hollow cylindrical axial portions (not shown) projecting coaxially with the harness inserting hole 8 from the inner surfaces of the top/bottom walls 10, 11 of the movable base 5', the axial portion can be engaged pivotably with ring-shape grooves (not shown) on top/bottom surfaces of the swing member 6.

The swing member 6 has a coaxial vertical harness inserting hole (not shown) inside the ring-shape axial portion. The vertical harness inserting hole is communicated coaxially with the harness inserting hole 8 of the movable base 5' and continued to a horizontal harness inserting hole 14 of the swing member 6. The vertical harness inserting hole is formed with a round cross section, and the horizontal harness inserting hole 14 is formed with a rectangular cross section or an oval cross section corresponding to a later-described protecting tube 15.

The swing member 6 is formed separable to top and bottom portions. In a condition of separating to the top and bottom portions, the wiring harness 2 can be inserted into the harness inserting hole. The top and bottom portions are fixed to each other with lock means, such as a bolt or locking hook and engaging recess. A front end 6a of the swing member 6 faces to a car body (fixed structure) to be pivotable in a back-and-forth direction of the car body.

One end of the protecting tube 15 made of synthetic resin is held and fixed in the horizontal harness inserting hole 14 of the swing member 6. The protecting tube 15 is a usual corrugate tube with surrounding concave grooves and surrounding convex ribs (not shown) arranged alternately in a lengthwise direction of the tube to have a good flexibility. Ribs to be engaged with the concave grooves of the protecting tube with the oval cross section and fixed together are arranged on an inner surface of the horizontal harness inserting hole 14 of the swing member 6. If a protecting tube with a round cross section is used, the protecting tube 15 is held rotatably in a round direction by the ribs.

The other end of the protecting tube 15 is fixed by ribs similar to that of the swing member 6 on a harness fixing unit 16 at the car body. A plurality of electric wires 17 of the wiring harness 2 from the harness fixing unit 16 is connected with a connector of a wiring harness (not shown) at the car body (power supply side).

The harness fixing unit 16 is rigidly fixed on the car body with a plurality of bolts. The harness fixing unit 16 will be described later in detail in a third embodiment. The wiring harness 2 is wired horizontally from the swing member 6 to the harness fixing unit 16.

FIG. 3 shows a complete closed condition, in which the sliding door (not shown) is closed forwardly. The vertical path portion 3 of the wiring harness 2 is held so as to be slanted by swinging rearwardly around the harness fixing member 4 fixed on the sliding door. The movable base 5' continued to the vertical path portion 3 moves rearwardly together with the vertical path portion 3. Thereby, the swing member 6 pivots slantwise rearwardly about the top and bottom axial portions (not shown). The protecting tube 15 of the wiring harness 2 is pulled rearwardly to extend straightly between the swing member 6 and the harness fixing unit 16 at the car body.

The movable base 5' is pulled rearwardly and moved by the protecting tube 15 of the wiring harness 2 to make the harness fixing unit 16 at the car body as a fixed point in accordance with a motion of closing the sliding door. The harness fixing member 4 moves to be integrated with the sliding door, and the movable base 5' moves through the vertical path portion 3 of the wiring harness 2 together with the sliding door, and the swing member 6 moves to be integrated with the movable base 5'.

By sliding the sliding door in the closed condition in FIG. 3 rearwardly to open it (completely open), the harness fixing member 4 moves rearwardly to be integrated with the sliding door as shown in FIG. 4. Thereby, the vertical path portion 3 of the wiring harness 2 pivots slantwise forwardly about the harness fixing member 4 as a fixed point, and the movable base 5' moves forwardly together with the vertical path portion 3, the swing member 6 pivots slantwise forwardly about the axial portions. Therefore, the protecting tube 15 of the wiring harness 2 is bent forwardly to be formed into a U-shape or J-shape about the harness fixing unit 16 as a fixed point at the car body. The movable base 5' is held in a condition to move forwardly through the swing member 6 by an elastic restoring force of the protecting tube 15 of the wiring harness 2.

During a complete-closed condition of the sliding door in FIG. 3 and a full-open condition of the sliding door in FIG. 4, the vertical path portion 3 of the wiring harness 2 is twisted between the swing member 6 and itself (including the part of the wiring harness 2 in the harness inserting hole 8 of the movable base 5' and a part 18 of the wiring harness 2 in the vertical harness inserting hole of the swing member 6) in a round or axial direction so as to absorb the pivot motion of the swing member 6 smoothly (absorb the slack of the wiring harness 2).

The vertical path portion 3 of the wiring harness 2 swings forward and rearward with the same angle in the complete closed condition and the full-open condition of the sliding door. The swing angle is small for example 20-30 degree. A length of the vertical path portion 3 of the wiring harness 2 may be short and of 20-30 cm. Allowing the vertical path portion 3 freely to twist in the round direction and swing back-and-forth (direction of opening/closing the sliding door), arranging the swing member 6 pivotable back-and-forth direction about the movable base 5', and making the protecting tube 15 of the wiring harness 2 horizontally bendable to the U-shape or the J-shape, the sliding door having such compact structure can be opened and close.

Figure 6:
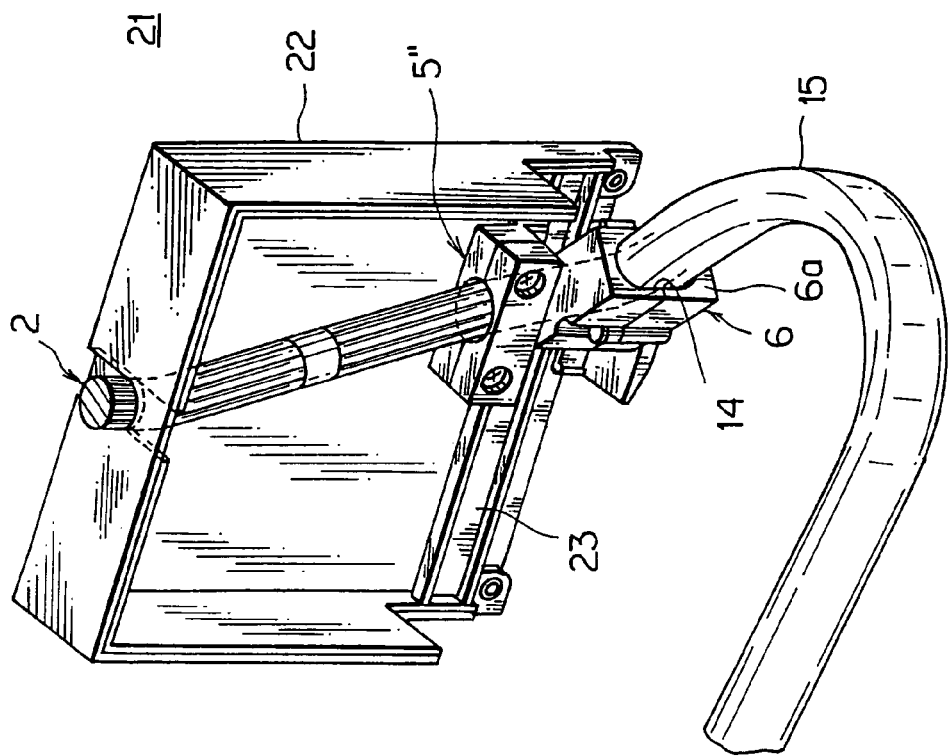
FIG. 6 is a perspective view of the sliding structure in an open condition of the third embodiment of the power supply apparatus shown in FIG. 5.
Figure 5:
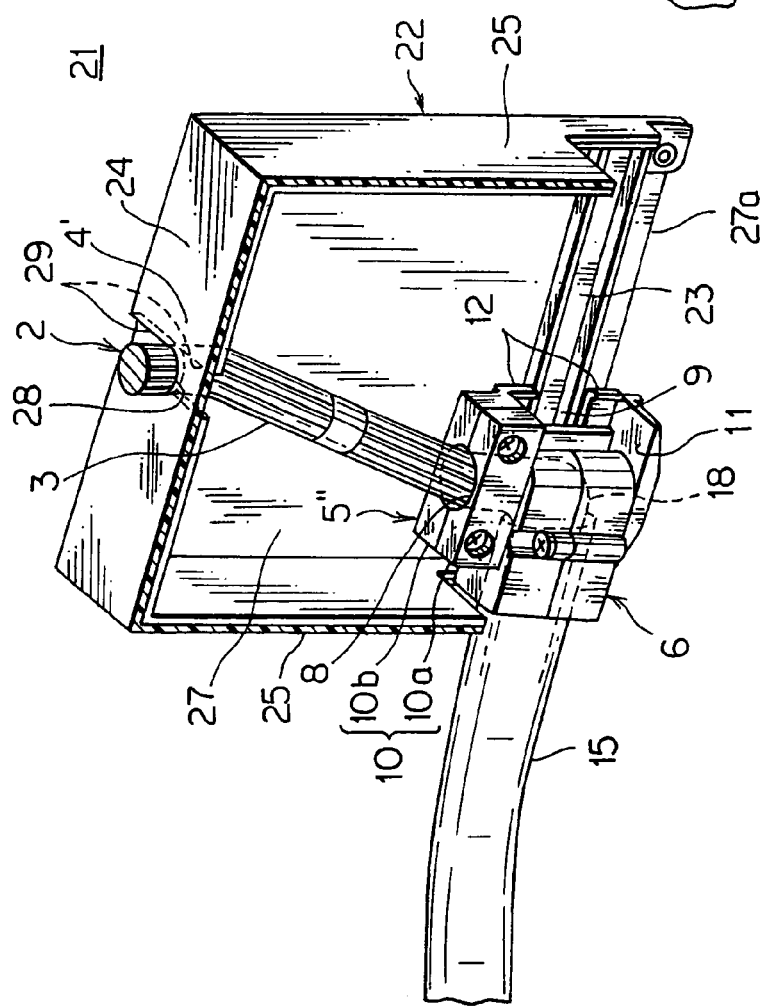
FIG. 5 is a perspective view of a sliding structure in a closed condition of a third embodiment of a power supply apparatus for the sliding structure according to the present invention.

FIGS. 5, 6 show a third embodiment of a power supply apparatus for a sliding structure according to the present invention.

The power supply apparatus 21 for the sliding structure corresponds to the power supply apparatus for the sliding structure 1' shown in FIGS. 3, 4, in which, instead of the movable base 5', a slider 5" is engaged slidably with a guide rail 23 in a case 22, and an top wall 24 of a case 22 is used as the harness fixing member 4'. The same components as that in FIGS. 3, 4 are shown with the same marking and explanation for them being omitted.

As shown in FIGS. 5, 6, the case 22 is formed into a rectangular shape (nearly square shape) with synthetic resin or metal, and includes the horizontal top wall 24, vertical both side walls 25, a rear wall 27 and a front wall (not shown). The rear wall 27 has a downwardly extending portion 27a and an inner surface of the rear wall 27 and the extending portion 27a is provided horizontally with a guide rail 23. The slider 5" as the movable base is engaged slidably with the guide rail 23. The swing member 6 is supported pivotably in the horizontal plane around an axial portion (not shown) by the slider (movable base) 5".

The vertical path portion 3 of the wiring harness 2 is fixed at the top end thereof on the top wall 24 of the case 22. The vertical path portion 3 can swing freely together with the slider 5" in the case 22. The part (electric wires) of the wiring harness 2 continued to the vertical path portion 3 is led through the vertical harness inserting hole 8 of the slider 5" and the harness inserting hole 14 (FIG. 6) from a vertical portion to a horizontal portion of the swing member 6, and through an inside of the protecting tube 15, and to the harness fixing unit 16 (FIG. 3) at the car body (the fixed structure).

Figure 7:
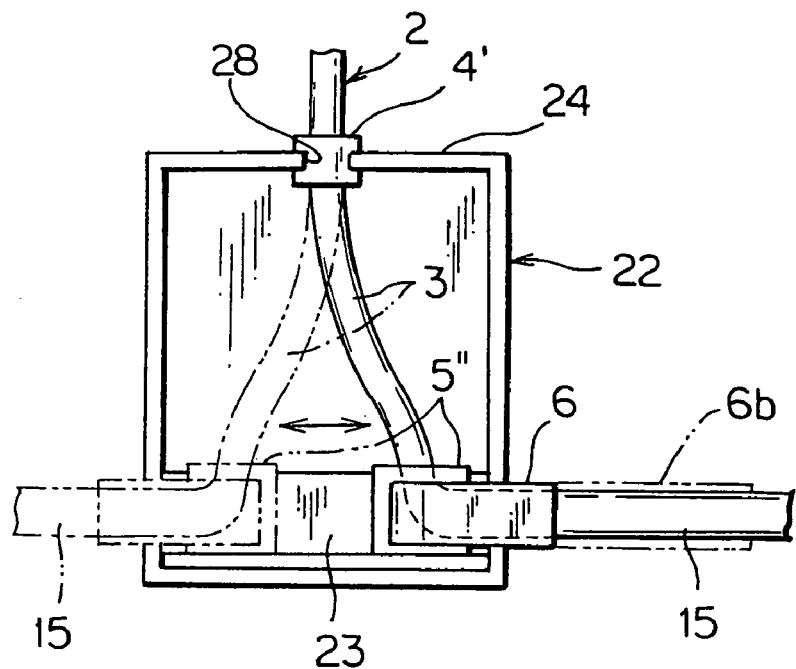
FIG. 7 is a front view of the sliding structure in the closed/open conditions of the third embodiment of the power supply apparatus shown in FIG. 5.

The round harness inserting hole 28 of the top wall 24 of the case 22 is formed by a lap portion of each of the slit holes 29 formed symmetrically to each other at a top wall 24 of a case body and a top wall 24 of the cover. The harness fixing member 4' can be a rubber-like elastic member fitting to the harness inserting hole 28 of the top wall 24 as shown in FIG. 7. The harness fixing member 4' can also be a vertical projecting wall (not shown), integrated with the case 22, to fix the vertical path portion 3 of the wiring harness 2 with a tape or band.

The guide rail 23 is arranged to fill an inner width of the case 22, and the top wall 10 of the slider 5" is separated to a front side portion 10a and a rear side portion 10b so as to clamp slidably the guide rail 23, as shown in FIGS. 5, 6. The slider 5" and the guide rail 23 can have another structure for engaging to each other if required, other than the above structure. The vertical rear wall 12 continues to the top wall 10 of the slider 5", and the horizontal bottom wall 11 continues to the rear wall 12 so as to form a U-shape groove as space 9 among the top wall 10, the rear wall 12 and the bottom wall 11. The space 9 exposes at a bottom side of the case 22, and the swing member 6 is supported pivotably in the space 9 by the axial portion so as to be exposed.

Similarly as above embodiments, the length of the vertical path portion 3 of the wiring harness 2 is made short, and the case 22 is designed compact to have a small height, width and depth. The case 22 is fixed on the vertical panel of the sliding door (sliding structure) with fixing means, such as a bolt or a lock clip.

According to opening/closing the sliding door, the slider 5" moves back-and-forth along the guide rail 23, and the vertical path portion 3 of the wiring harness 2 swings back-and-forth about the harness fixing member 4' at the top side in the case 22 so as to be twisted in a round or axial direction, as shown in FIG. 7. The complete-closed condition of the sliding door is shown with a left-side long dashed double-short dashed line in FIG. 7, and the full-open condition of the sliding door is shown with a right-side solid line in FIG. 7. A right-side long dashed double-short dashed line shows an embodiment of extending horizontally a cylindrical portion 6b of the swing member 6 for preventing slacking of the protecting tube 15 of the wiring harness 2. The length of the extended cylindrical portion 6b is limited in an area in which the protecting tube 15 can extend straight from the front end 6a of the swing member 6 in FIG. 6. Such structure can be applied to the embodiment in FIG. 3.

Figure 8:
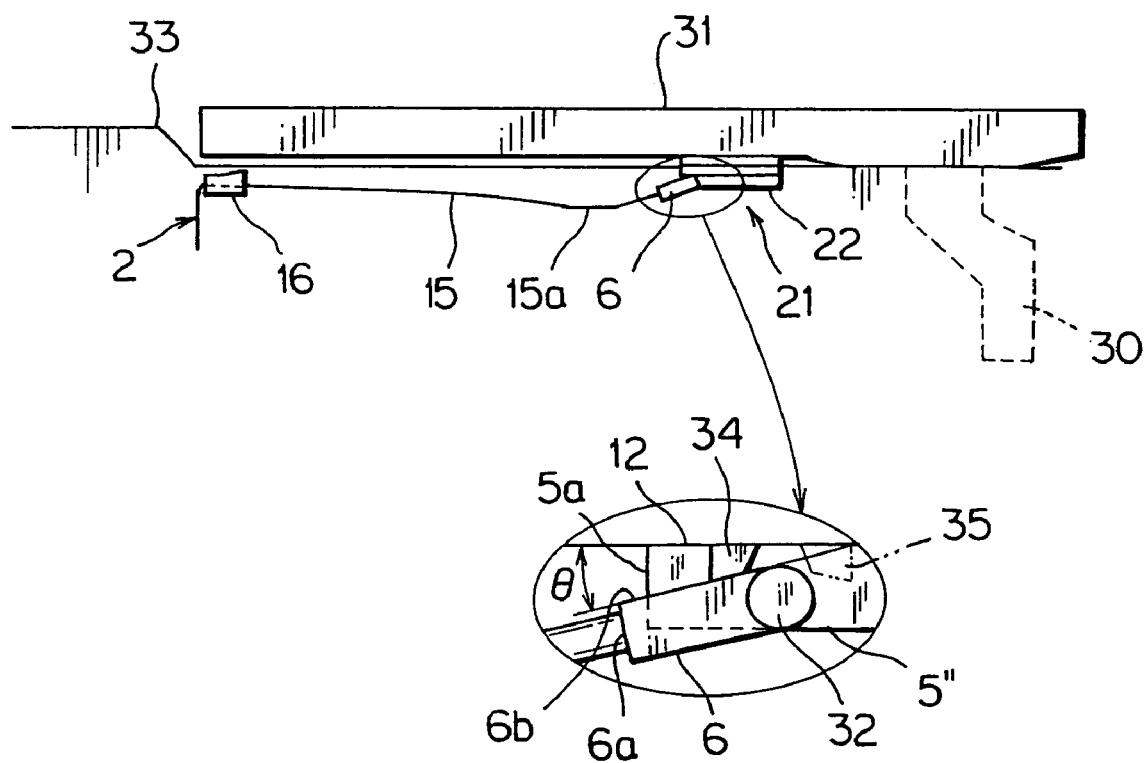
FIG. 8 is a plan view and an expanded view in a circle of a wiring harness in the closed/open conditions of the sliding structure mounting the power supply apparatus according to the present invention.

FIG. 8 shows a plan view of the complete-closed condition of the sliding door. A sliding door 31 is supported slidably through top and bottom brackets 30 having a guide roller (not shown) by the car body. The case 22 of the power supply apparatus 21 is fixed at a half front side of the sliding door 31. The slider 5" is positioned at a rear end of the case 22. The swing member 6 is supported by an axial portion 32 to orient the front end 6a slightly slantwise rearward (toward an inside of a car body 33). The protecting tube 15 of the wiring harness 2 projects slightly from the swing member 6 into the car body 33, and curves smoothly (curved portion is shown with a marking 15a) to continue to the harness fixing unit 16 at the car body.

As shown in an expanded view circled in FIG. 8, a stopper projection 34, used as an angle limiter, for limiting a swing angle q of the swing member 6 is provided between the axial portion 32 and the rear end 5a at the half bottom portion of the rear wall 12 of the slider 5". In the complete-close condition of the sliding door, the door-side surface 6b of the swing member 6 abuts on the stopper projection 34, and the swing member 6 stops to be oriented slightly toward the inside of the car body.

Figure 9:
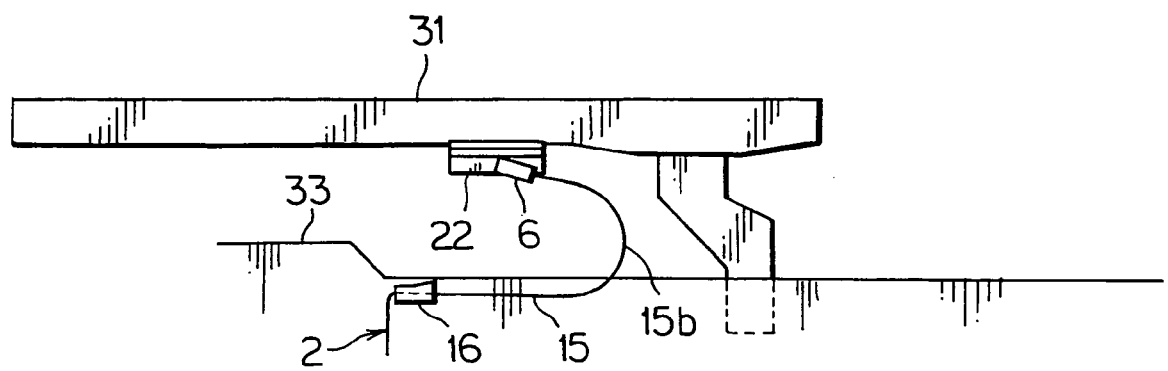
FIG. 9 is a plan view of a wiring harness in a middle way condition of the sliding structure shown in FIG. 8.

By using the stopper projection 34, when the sliding door 31 starts to open, the swing member 6 rotates smoothly counterclockwise in FIG. 8, and the protecting tube 15 of the wiring harness 2 can be bent into the U-shape (the bent portion 15b) smoothly and securely on a middle way to open the sliding door in FIG. 9. Thereby, only by using the usual low-cost corrugate tube as the protecting tube 15, the wiring harness 2 can be bent along a constant trace without a usual expensive caterpillar-like cover.

As shown with a long dashed double-short dashed line in an expanded view circled in FIG. 8, another stopper projection 35 (a second stopper projection) can be provided front-rear symmetrically against the first stopper projection 34 on the rear wall 12 of the slider 5". Thereby, limiting the rotation angle q' of the swing member 6 at full-open condition of the sliding door in FIG. 10, rotating motion of the swing member 6 from full-open condition to close the sliding door 31 can be started smoothly. It is also effective in the case of providing the stopper projection only at the rear side (the first stopper projection 34) or only at the front side (the second stopper projection 35. By providing one or both of stopper projections 34, 35, the rotation angle of the swing member 6 can be limited less than 180 degree.

The sliding door 31 moves outward from the car body 33 in the middle way of opening the sliding door 31 in FIG. 9, and the protecting tube 15 of the wiring harness 2 is bent into the U-shape with a relatively large radius (at 15b). In the full-open condition in FIG. 10, the horizontal portion 15 of the wiring harness 2 is bent into the J-shape maintaining the relatively large radius.

The harness fixing unit 16 is rigidly fixed at the car body. Between the closed condition of the sliding door 31 in FIG. 8 and the middle way of open condition thereof in FIG. 9, the protecting tube 15 of the wiring harness 2 extends straightly from the harness fixing unit 16. As shown in an expanded view circled in FIG. 10 of the full-open condition, the protecting tube 15 of the wiring harness 2 is curved smoothly with a relatively large radius (curved point 15c) along a curved guide surface formed on a near-side to the sliding door at a front end of a harness inserting hole 36 of the harness fixing unit 16 and led toward the door side of the swing member 6. The curved guide surface 37 prevents the protecting tube 15 of the wiring harness 2 from folding, thereby durability of bending of the horizontal portion is improved.

As shown in FIG. 11, the harness fixing unit 16 is formed into a rectangular shape with synthetic resin, and has a large cutout 38a in a portion facing the sliding door of an opening 38 at a front end thereof. The curved guide surface 37 is formed on an inside of the cutout 38a and continued tangentially to the straight harness inserting hole 36 as shown in the expanded view in FIG. 10. On the inner surface of the harness inserting hole 36, a rib 39 to be engaged with the concave groove of the protecting tube 15 is formed. To design the harness fixing unit 16 separable to top and bottom portions, the protecting tube 15 can be assembled in the harness fixing unit 16.

Figure 10:
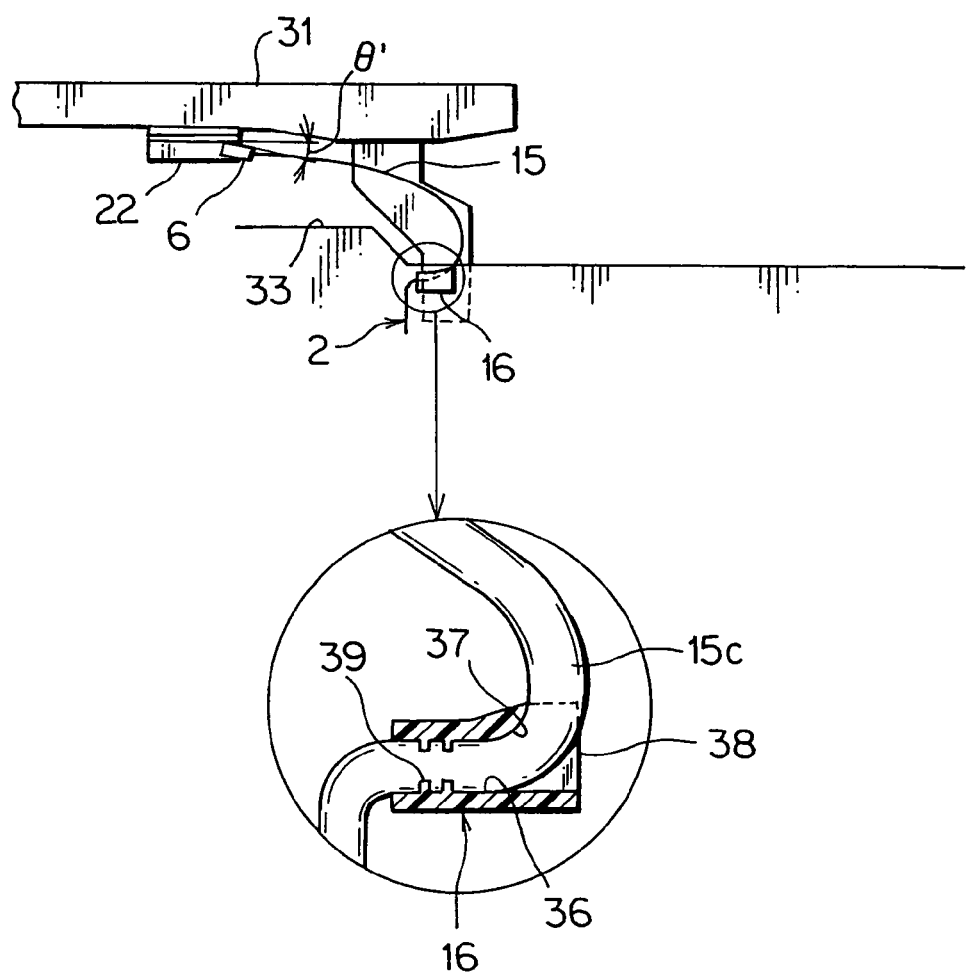
FIG. 10 is a plan view and an expanded view in a circle of a wiring harness in the full-open condition of the sliding structure shown in FIG. 8.

The stopper projections 34, 35 in FIG. 8 and a structure of the harness fixing unit 16 in FIGS. 10, 11 can be applied to the embodiments in FIGS. 1-4. Layout of the power supply apparatus in the sliding door and wiring of the wiring harness 2 in FIGS. 8-10 can be applied to the embodiments in FIGS. 1-4.

FIGS. 12-16 show a fourth embodiment of a power supply apparatus for a sliding structure according to the present invention.

Figure 12:
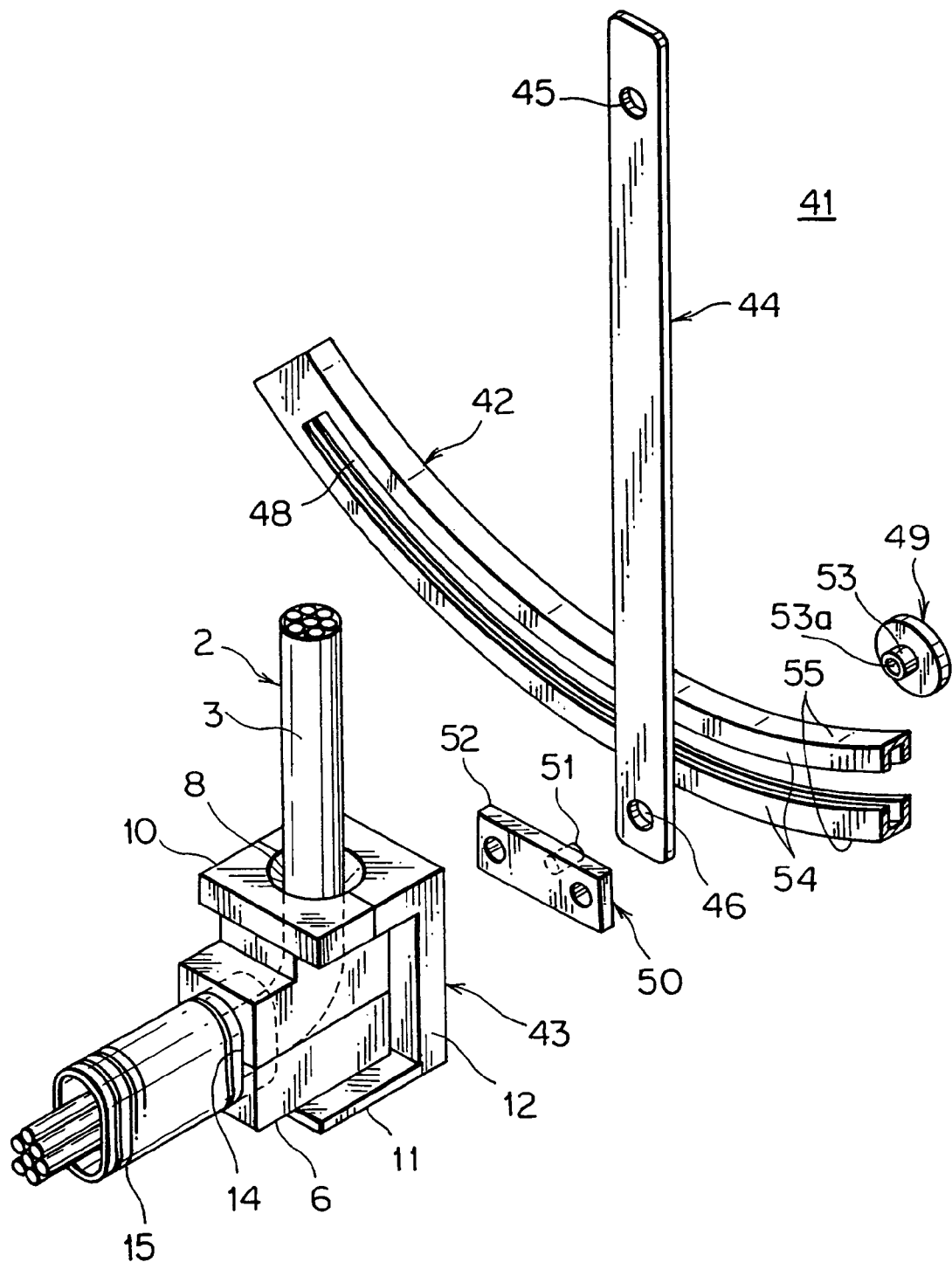
FIG. 12 is an exploded perspective view of a fourth embodiment of the power supply apparatus for the sliding structure according to the present invention.

As shown in FIGS. 12, 13, a power supply apparatus 41 for a sliding structure includes an arc-shape guide rail 42 made of metal or synthetic resin, a slider 43 as the movable base engaged slidably with the guide rail 42, the swing member 6 engaged pivotably in the horizontal plane with the slider 43, and a moving arm 44 for moving the slider 43 along the arc-shape guide rail 42.

The moving arm 44 is formed into a long strip plate having respectively round top and bottom holes 45, 46 for supporting at top and bottom ends thereof. The moving arm 44 is supported pivotably at the top hole 45 by a pivot pin 47 such as a bolt on a mount portion 31, such as the inner panel of the sliding door and car panel, as shown in FIG. 14.

The bottom hole 46 is positioned along an arc-shape long slit 48 of the guide rail 42 as shown in FIGS. 12, 14-16. A roller 49 is supported rotatably by a horizontal shaft 51 of a shaft unit 50 through the bottom hole 46 at the bottom end. The roller 49 is provided rotatably in the guide rail 42. The shaft 51 is engaged through the bottom hole 46 and the long slit 48 with a bearing hole 53a at the center of the roller 49. The roller 49 is held rotatably on the shaft 51 with a holding member (not shown), such as a C-ring retainer. A plate portion 52 of the shaft unit 50 is fixed on a rear surface of the slider 43 with a screw.

A distance between the top and bottom holes 45, 46 of the moving arm 44 is equal to a curvature radius of the center of the long slit 48 of the arc-shape guide rail 42. A swing tracing of the moving arm 44 corresponds to the arc-shape guide rail 42 and the shape of the long slit 48. The guide rail 42 has a front wall 54, arc-shape top and bottom walls 55 and a pair of flange-shape rear walls 56 (FIG. 14). The long slit 48 is formed in the center of a vertical direction of the front wall 54. The roller 49 touches rotatably and slidingly on an inner surface of the top and bottom walls 55.

A cylindrical bearing portion 53 of the roller 49 is engaged rotatably with the shaft 51 of the shaft unit 50. The roller 49 is rotatable against the shaft 50 and the slider 43, on which the shaft 50 is fixed. The bearing portion 53 is engaged slidably and rotatably with the long slit 48, and engaged rotatably with the bottom hole 46 of the moving arm 44. Thereby, the shaft 51 is engaged, through the bottom hole 46 without touching the moving arm 44, rotatably with a hole 53a of the bearing portion 53. Thereby, the slider 43 can be oriented horizontally by rotating as a separated part from the moving arm 44 at both right/left end portions of the guide rail 42, as shown with long dashed double-short dashed lines in FIG. 15.

Figure 16:
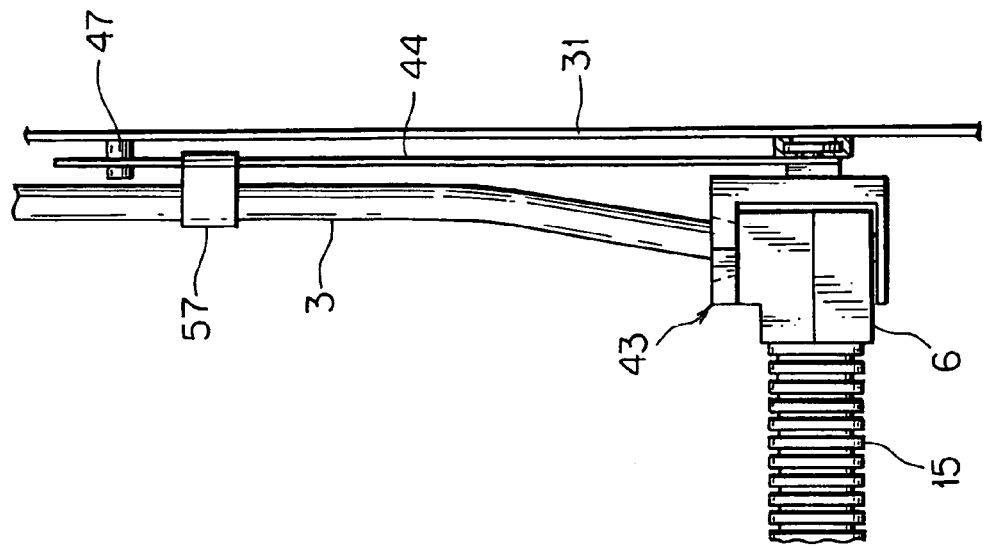
FIG. 16 is a side view of the power supply apparatus shown in FIG. 12.
Figure 15:
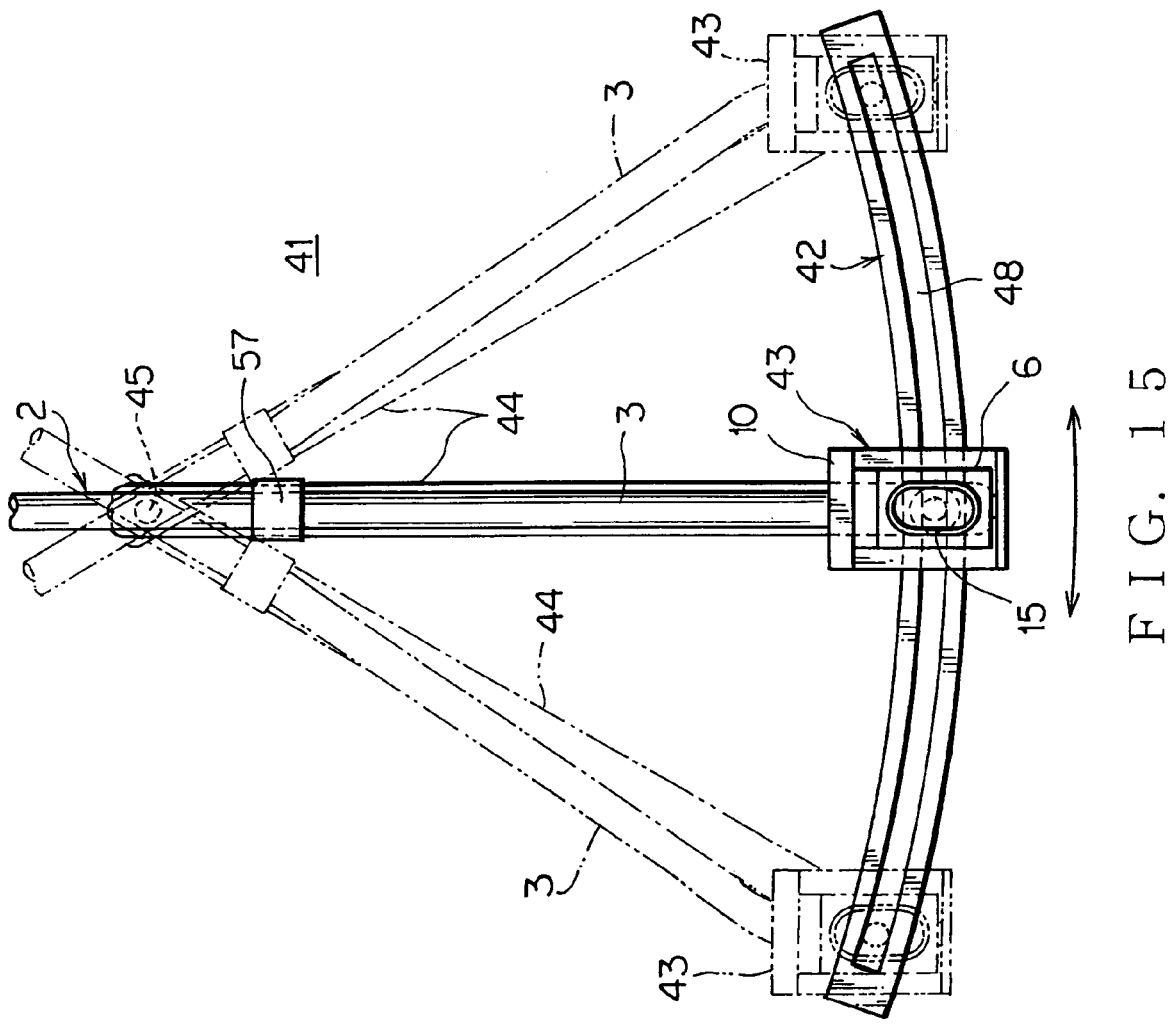
FIG. 15 is a front view showing actions of the power supply apparatus shown in FIG. 12.
Figure 17:
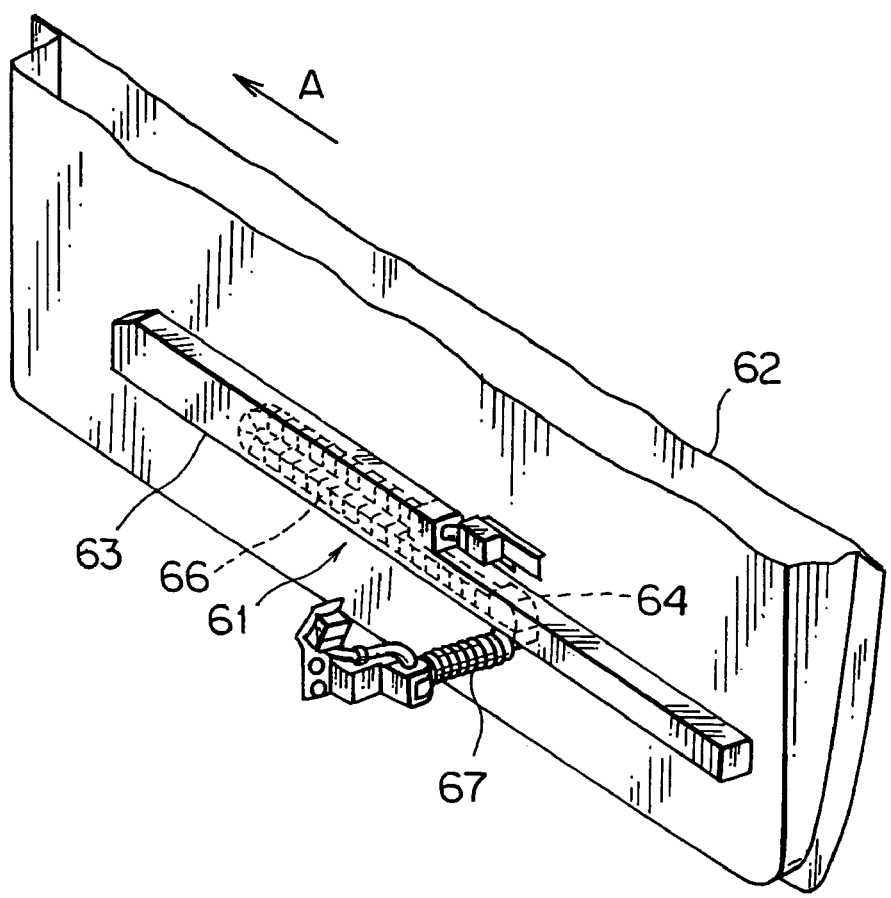
FIG. 17 is a perspective view of one embodiment of a power supply apparatus for a sliding structure of the prior art.
Figure 18:
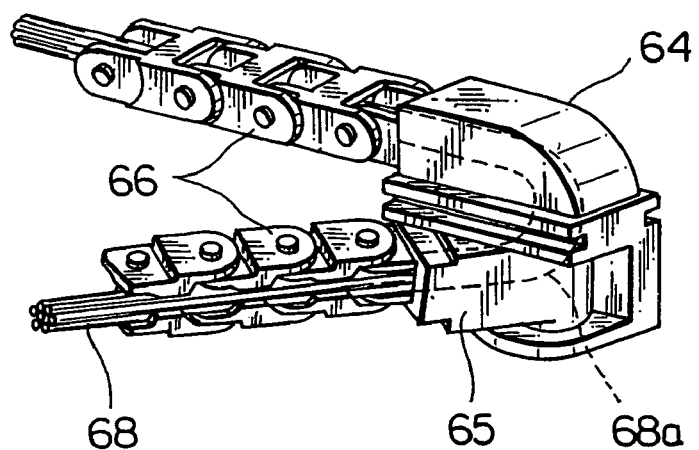
FIG. 18 is a perspective view showing a main part of the power supply apparatus shown in FIG. 17.

As shown in FIGS. 14-16, the vertical path portion 3 of the wiring harness 2 (plurality of electric wires) is wired vertically along the moving arm 44 and fixed at a top end area of the moving arm 44 with a bundling means (harness fixing member) 57, such as a tape or a band. The wiring harness continued to the vertical path portion 3 is wired through the harness inserting hole 8 of the top wall 10 of the slider 43 at a bottom end area of the moving arm 44 and the swing member 6, and horizontally toward the car body. The harness inserting hole 8 is tapered upwardly to easily bend (slant) the vertical path portion 3 toward the moving arm 44 and smoothly move the vertical path portion 3 along the guide rail 42.

Since the vertical path portion 3 is always wired at a constant length and fixed on the moving arm 44 by fixing the wiring harness 2 on the moving arm 44 even if the wiring harness had changing of the length thereof in production, the vertical path portion 3 can be moved smoothly together with the moving arm 44 without a compressive or tensile force caused by changing of the length of wiring harness 2.

The guide rail 42 is fixed on an inner panel of the sliding door 31, or arranged in a case similarly as the embodiment in FIG. 5. When the case (similar to the case 22 in FIG. 5) is used, the top of the moving arm 44 is supported rotatably on the rear wall 27 of the case 22 by a bolt, and the vertical path portion 3 is fixed on the moving arm 44, so that the harness fixing member 4' at the top wall 24 of the case 22 in FIG. 5 can be eliminated. The case 22 is fixed on the inner panel of the sliding door 31.

Basic structure of the slider 43, the swing member 6 and the wiring harness 2 is almost similar to the embodiment in FIG. 5, so that the similar components to that in FIG. 5 are given the same marking and detailed description is omitted.

As shown in FIG. 12, the slider 43 is formed into a U-shape with the top wall 10, a bottom wall 11 and the rear wall 12. The swing member 6 is engaged in an inner space of the slider 43 at a shaft portion 58 (FIG. 14) pivotably with the slider 43. The shaft unit 50 is fixed on the rear wall 12. AS shown in FIG. 14, the harness inserting hole 8 continues to the vertical harness inserting hole 14 of the swing member 6, and the end of the protecting tube 15 is held and fixed in the harness inserting hole 14. Wire part of the wiring harness 2 under the vertical path portion 3 is bent in the swing member 6 and inserted through the protecting tube 15.

In FIG. 15, when the sliding door 31 (FIG. 16) is in the complete-closed condition (the sliding door is moved to the right side in FIG. 15), the protecting tube 15 of the wiring harness 2 is pulled rearwardly (to the left side in FIG. 15) about the fixed point of the harness fixing unit 16 (FIG. 3) at the car body, and the vertical path portion 3 of the wiring harness 2 moves together with the moving arm 44 as shown with the left-side long dashed double-short dashed line in FIG. 15. When the sliding door 31 is in the full-open condition, the protecting tube 15 is pulled forwardly (to the right side in FIG. 15), and the vertical path portion 3 of the wiring harness 2 moves together with the moving arm 44 as shown with the right-side long dashed double-short dashed line in FIG. 15. When the sliding door 31 is in the middle way to open, the vertical path portion 31 is arranged vertically together with the moving arm 44 as shown in the solid line in FIG. 15.

Since, in any condition mentioned above, the slider 43 moves along the arc-shape guide rail 42, the length of the vertical path portion 3 of the wiring harness 2 is maintained at a constant value. In the embodiment of FIG. 5, when the sliding door 31 is in the middle way to open, the slider 5" is located in a middle position of the horizontal guide rail 23, and the vertical path portion 3 is slightly shortened (compressed), and the slider 5" is pushed downwardly to the guide rail 23 by a compressive force. Thereby, unexpected friction force between the slider 5" and the guide rail 23 may be generated.

According to the embodiment in FIG. 15, the above problem is overcome, and the slider 43 slides on the guide rail 42 always with a very small friction, so that wear between the slider 43 and the guide rail 42 is controlled in a very small value and the slider 43 can move smoothly by a small force. The vertical path portion 3 of the wiring harness 2 is not compressed, so that absorbing slider motion by twisting the vertical path portion 3 is improved and durability of the vertical path portion 3 is increased.

As shown in FIG. 15, the slider 32 is always oriented horizontally when the sliding door 31 is opened and closed (the vertical path portion 3 is moved), so that the protecting tube 15 as a part of the wiring harness 2 toward the car body is prevented from twisting. Thereby, increase of friction force of the swing member 6 caused by twisting the protecting tube 15 is prevented, and the protecting tube 15 can be bent smoothly (see FIG. 6) and durability of bending of the protecting tube 15 is improved.

In the fourth embodiment, the moving arm 44 is formed into a long strip plate. Instead of that, a long bar can be used. The roller 49 can be provided to be integrated with the moving arm 44 and the roller guide 49 would be inserted into the guide rail from a side opening (not shown) of the guide rail 42.

By eliminating the moving arm 44, only the guide rail 42, the slider 43 and the swing member 6 can structure the power supply apparatus. In this case, similarly as the embodiment in FIG. 5, the slider 43 slides along the arc-shape guide rail 42 according to opening/closing the sliding door, and the vertical path portion 3 of the wiring harness 2 with a constant length swings about the harness fixing member 4 (FIG. 1) at top side.

By eliminating the rotatable roller 49, an arc-shape slidable member (not shown) can be used as the guide rail 42 so as to engage the shaft 51 of the slider 43 rotatably to the slidable member. The curvature radius of the curved guide rail 42 is suitably designed corresponding to a sliding length of the sliding door 31.

The stopper projection 34, 35 or the harness fixing unit 16 or the guide surface 37 of the harness fixing unit 16 can be effectively applied to the fourth embodiment.

In each embodiment shown in FIGS. 1-16, the vertical path portion 3 of the wiring harness 2 is fixed at the top end thereof by the harness fixing member 4, 57, and held at the bottom end thereof by the fixed base 5 (FIG. 1) or the movable base 5' (FIG. 3) or the slider 5", 43 (FIGS. 5, 12). By turning the power supply apparatus 1, 1', 21, 41 upside-down, and fixing the vertical path portion 3 at the bottom end with the harness fixing member 4, 57, the vertical path portion 3 can be held at the top end thereof with the fixed base 5 (FIG. 1), the movable base 5' (FIG. 3) or the slider 5" (FIGS. 5, 12).

The harness protecting tube 15 can be applied with a synthetic resin net tube, a flat tube, an elastic tube made of urethane or rubber other than the bellows tube. A bellows tube made of rubber other than the synthetic resin protecting tube can be used. The shape of bellows is not limited to the rectangular cross section like a corrugate tube but a triangle cross section or a sine wave cross section can be used.

In each embodiment above, the power supply apparatus is mounted on the sliding door 31 of the car. The power supply apparatus of each embodiment can be applied on any sliding structures such as a sliding door for a vehicle other than a car and a sliding door for manufacturing machine.

What is claimed is:

1. A power supply apparatus for a sliding structure comprising:
    a wiring harness having a vertical path portion;
    a harness fixing member for directly fixing one end of the vertical path portion of the wiring harness on the sliding structure;
    a fixed base fixed on the sliding structure for directly holding the other end of the vertical path portion; and
    a swing member mounted on the fixed base to swing freely in a horizontal plane for allowing the vertical path portion to be twisted freely along an axial direction of itself and leading a part of the wiring harness continued to the vertical path portion toward a fixed structure.

2. The power supply apparatus for a sliding structure according to claim 1, further comprising a protecting tube passing the part of the wiring harness therethrough, wherein the protecting tube is wired linearly when the sliding structure is closed and is bent when the sliding structure is opened.

3. The power supply apparatus for a sliding structure according to claim 2, further comprising a stopper projection limiting a movable angle of the swing member less than 180 degrees.

4. A power supply apparatus for a sliding structure comprising:
- a wiring harness having a vertical path portion;
- a harness fixing member for directly fixing one end of the vertical path portion of the wiring harness on the sliding structure;
- a movable base holding the other end of the vertical path portion; and
- a swing member mounted on the movable base to swing freely in a horizontal plane for allowing the vertical path portion to be twisted freely along an axial direction of itself and leading a part of the wiring harness continued to the vertical path portion toward a fixed structure.

5. The power supply apparatus for a sliding structure according to claim 4 further comprising a guide rail engaging slidably with the movable base.

6. The power supply apparatus for a sliding structure according to claim 5, wherein the guide rail is formed into an arc shape.

7. The power supply apparatus for a sliding structure according to claim 6, wherein the movable base is supported rotatably by the guide rail so as to be oriented horizontally.

8. The power supply apparatus for a sliding structure according to claim 7, further comprising a moving arm, wherein one end of the moving arm is connected to the movable base, and the other end of the moving arm is supported movably by the sliding structure.

9. The power supply apparatus for a sliding structure according to claim 8, further comprising a case for receiving the vertical path portion and the movable base.

10. The power supply apparatus for a sliding structure according to claim 9, further comprising a protecting tube passing the part of the wiring harness therethrough, wherein the protecting tube is wired linearly when the sliding structure is closed and is bent when the sliding structure is opened.

11. The power supply apparatus for a sliding structure comprising:
- a wiring harness having a vertical path portion;
- a harness fixing member for directly fixing one end of the vertical path portion of the wiring harness on the sliding structure;
- a fixed base fixed on the sliding structure for directly holding the other end of the vertical path portion;
- a swing member mounted on the fixed base to swing freely in a horizontal plane for allowing the vertical path portion to be twisted freely along an axial direction of itself and leading a part of the wiring harness continued to the vertical path portion toward a fixed structure;
- a protecting tube passing the part of the wiring harness therethrough, wherein the protecting tube is wired linearly when the sliding structure is closed and is bent when the sliding structure is opened; and
- further comprising a harness fixing unit for fixing the protecting tube to pass the part of the wiring harness therethrough on the fixed structure, wherein the harness fixing unit has a guide surface for forming the protecting tube into a curved shape when the sliding structure is completely opened.

12. The power supply apparatus for a sliding structure according to claim 11, wherein the protecting tube is a flat bellows-type tube.

13. A power supply apparatus for a sliding structure comprising:
- a wiring harness having a vertical path portion;
- a harness fixing member for directly fixing one end of the vertical path portion of the wiring harness on the sliding structure;
- a movable base on the sliding structure for directly holding the other end of the vertical path portion;
- a swing member mounted on the movable base to swing freely in a horizontal plane for allowing the vertical path portion to be twisted freely along an axial direction of itself and leading a part of the wiring harness continued to the vertical path portion toward a fixed structure;
- a guide rail formed in an arc shape engaging slidably with the movable base, the movable base supported rotatably by the guide rail so as to be oriented horizontally;
- a moving arm, wherein one end of the moving arm is connected to the movable base, and the other end of the moving arm is supported movably by the sliding structure;
- a case for receiving the vertical path portion and the movable base;
- a protecting tube passing the part of the wiring harness therethrough, wherein the protecting tube is wired linearly when the sliding structure is closed and is bent when the sliding structure is opened; and
- further comprising a harness fixing unit for fixing the protecting tube to pass the part of the wiring harness therethrough on the fixed structure, wherein the harness fixing unit has a guide surface for forming the protecting tube into a curved shape when the sliding structure is completely opened.

14. The power supply apparatus for a sliding structure according to claim 13, wherein the protecting tube is a flat bellows-type tube.

* * * * *

UNITED STATES PATENT AND TRADEMARK OFFICE
Certificate

Patent No. 7,482,538 B2

Patented: January 27, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Naomi Kisu, Shizuoka (JP); Masataka Nishijima, Shizuoka (JP); Motonari Inagaki, Nishikasugai (JP); and Tomoaki Nishimura, Kariya-shi, Aichi-ken (JP)

Signed and Sealed this Twenty-third Day of March 2010.

DIEGO F. F. GUTIERREZ
*Supervisory Patent Examiner*
Art Unit 2831